United States Patent Office 3,783,062
Patented Jan. 1, 1974

3,783,062
METHOD FOR FLAME BONDING BY USE OF HIGH VELOCITY, HIGH TEMPERATURE DIRECT FLAME
Wilhelm N. Martin, Grand'Mère, Quebec, Canada, assignor to Consolidated-Bathurst Limited, Montreal, Quebec, Canada
Filed Jan. 27, 1972, Ser. No. 221,167
Int. Cl. B32b *31/26, 31/12*
U.S. Cl. 156—82      9 Claims

ABSTRACT OF THE DISCLOSURE

A method and apparatus for obtaining rapid bonding of thermoplastic materials to themselves or other similar or different materials by the use of a high velocity, high temperature direct flame in combination with pressure. The method is sufficiently rapid so that the properties of the materials are not substantially detrimentally affected. Thin laminates of highly oriented materials can be bonded without loss of strength characteristics.

---

This invention relates, in one aspect, to bonded or laminated materials; in a further aspect, this invention relates to an improved method by which two or more layers of materials may be laminated together by means of flame bonding; and in a still further aspect, to an apparatus for carrying out the method to produce bonded or laminated materials.

More particularly, in accordance with the method of this invention, there is provided a novel method of bonding or laminating two or more layers of materials together to form an improved bonded laminate, by employing a high velocity, high temperature flame in combination with pressure in such a manner that the desirable properties of the layers of the materials being bonded together are not substantially detrimentally affected by the flame-bonding conditions.

PRIOR ART

Flame treatment of thermoplastic surfaces, to render the same susceptible to bonding to one or more layers of other materials, is well known in this art. The flame treatment, using a combustible gaseous agent, has been used to treat such materials as thermoplastic surfaces whereby such surfaces are susceptible to adhering to various types of materials—for example, coating or printing materials, etc.

One prior art method in particular, involves impinging a jet of hot air or gas at a velocity of from 4,000 to 10,000 feet per minute, while employing temperatures of 600 to 1,000° F., against the surface of a thermoplastic film to render it bondable to another film. The two films are then pressed together to form a laminate. In this prior art teaching, higher velocities are not recommended. In copending application, Ser. No. 819,752 filed Apr. 28, 1969, now abandoned there is disclosed a method of bonding two layers of materials together, wherein one such layer is thermoplastic, by applying a flame directly to the surface of the thermoplastic material immediately prior to pressing the layers together. In this technique, and in general of the prior art methods, flame bonding results in the deleterious alteration of the bulk characteristics of the material being treated, so that upon obtaining a bonded material or laminate, the properties of the combined materials are substantially different from those of the individual layers prior to bonding treatment. In this respect, this has been found to be particularly the case with very thin films and/or webs. Likewise, in the case of highly oriented materials, a further disadvantage is that the strength characteristics of the material are reduced, which in some cases, will make the resulting bonded laminate unsuitable for certain uses.

At the present time, flame bonding techniques have not found commercial usage to any extent, but rather, they have been replaced by other bonding techniques due to the above disadvantages. A further reason for other bonding techniques substantially replacing flame bonding is that uniform, controlled results cannot normally be obtained compared to other techniques. This will be evident from examination of bonded materials or laminates produced by conventional flame treating techniques wherein, e.g. one thermoplastic film is bonded to itself or to non-thermoplastic materials such as paper, metal materials e.g. foils, etc. as tests will show that variations in the degree of bonding are probably considered to be caused by a non-uniform distribution of flame temperatures.

With this invention, applicant has developed a novel method of flame bonding various types of materials to themselves, or to other materials, which method overcomes the disadvantages of the prior art and provides a resulting bonded material or laminate substantially free from the disadvantages of prior art bonded materials or laminates. Still further, the method of this invention does not detrimentally affect the properties of the materials being bonded to any extent, as compared to prior art procedures, and the resulting bonded laminate or product has substantially the same properties as the individual materials forming the product. Thus, the resulting product does not possess a loss of strength characteristics compared to products which were produced by prior art techniques.

In accordance with the method aspect of this invention, there is provided an improvement in a method of bonding wherein there is provided a supply of such bondable material, said supply including at least one bondable thermoplastic material, heating the surface of said material by applying, in direct contact therewith, a high velocity gaseous flame, said heating being applied to such surface to render the surface substantially uniformly heated in a substantially continuous path thereon, said flame having a flame velocity of above 10,000 feet per minute and a temperature above 1,000° F., subsequently causing the heated surface to be brought into juxtaposition with a further surface and pressing said heated surface and said further surface to form a substantially uniformly bonded laminate.

In accordance with a further aspect of this invention, there is provided a product which in brief summary, includes at least one layer of a thermoplastic material substantially uniformly bonded to a further layer without the use of adhesives, the thermoplastic layer having been heated with a gaseous high velocity flame having a velocity greater than 10,000 feet per minute and a temperature of higher than 1,000° F. and pressed against said further layer, the bonded material having the property of substantially no reduction in bulk characteristics compared to the materials individually forming the bonded material.

In carrying out the process of the present invention, the bonding velocity (denoting the velocity at which the heated surfaces to be bonded together, are brought into juxtaposition) will depend on several factors, including the nature and type of surface and material being bonded, as well as other parameters defined hereinafter. For any given set of conditions or parameters, the bonding velocity should desirably be maintained as high as possible commensurate with achieving adequate bonding. Where adequate speed controls are available, it will be possible to control the degree of bonding and bulk property effects by varying the bonding speed. Thus, for example, by increasing the bonding velocity from a rate of 125 feet per minute to 200 feet per minute, the bulk tensile of a woven laminate increased from 34 p.l.i. to 82 p.l.i., and the bond strength (peel) decreased from 7 p.l.i. to 5 p.l.i. (as shown in the accompanying examples).

Desirably, the flame velocity (and depending on the application) is maintained as high as possible, having regard to technical feasibilities of the equipment being used to carry out the process. In the prior art, recommended flame velocities were generally much lower than 10,000 feet per minute (f.p.m.) to avoid such problems as surface rippling. In contrast, it has been found by the applicant that very high rates of heat transfer can be effected by very high flame velocities and when combined with the proper bonding velocity, the surface depth to which melting will occur can be restricted to microscopic dimensions thereby avoiding any bulk surface defects (in addition to avoiding other bulk effects mentioned above). For these and other reasons, the process of the present invention utilizes flame velocities above 10,000 f.p.m., and desirably within the range of from 12,000 to about 40,000 (or higher) f.p.m. This range of flame velocities has been found very effective to produce satisfactorily bonded products, when using a propane-air gaseous flame mixture. In this respect, as used in this specification, the term "flame velocity" in its proper context refers to the velocity of a flame jet as it leaves the burner exit.

In carrying out applicant's process, and as briefly outlined above, it is most desirable that all of the inter-related factors of the process are so chosen so as to obtain or utilize the highest intensity of each factor or parameter, to ensure and obtain the best possible commercial benefits (by, for example, maintaining the time element for treatment to a minimum commensurate with obtaining a desired bonding without substantial loss of bulk properties of the material being treated). In this respect, as the time element is dependent on bonding velocity, so the desired flame temperature will depend to a large extent on bonding velocity and accordingly, since the highest possible bonding velocities are preferred, the highest possible temperatures are likewise most preferred in practicing the present invention. Thus, according to a preferred feature, and having due regard to economic combustible commercially available gases, temperatures above 2,000° F. are preferred and generally in the order of from 2,400–2,800° F. which have been found to be particularly effective using a gaseous propane-air mixture. However, temperatures above 1,000° F. have also been found effective for some products.

Within the scope of the present invention, and in general terms, most satisfactory results have been obtained when utilizing a flame positioned generally as close as possible to the surface(s) to be heated and bonded; however, as in the case of flame temperature, the flame location can also be varied depending on the bonding velocity. Still further, depending on the use of the end products and the nature of the surface(s) being heated, it may be desirable in certain circumstances to bring certain parts of the flame into direct contact with the surface(s) being treated. Thus, for example, in certain situations, it is desirable to bring an oxidizing flame, rather than the reducing portion of the flame, into contact with the bonding surface(s), or vice versa.

In general, the flame should also be as close as possible to the bonding point—i.e. as close as possible to the point at which the heated surface(s) are brought into juxtaposition with each other (or in other words, the bonding nip). To some extent, as will be obvious to those skilled in the art, the degree to which the bonding flame can be brought into proximity with the bonding nip will be dependent on the physical geometry of the bonding area—for example, on the size of the nip rolls used in bonding, and on the uniformity of the bonding (i.e. uniformity of temperature/heat transfer in the flame-surface contact area). Thus, for instance, improved bonding uniformity may require spacing the flame away from the bonding nip to allow additional time for better distribution of the heat/temperature prior to actual bonding. Thus, control/selection of flame temperature can also be effected if desired, by controlling the location of the flame.

In situations where it is not possible to locate the hottest part of the flame adjacent the nip due to physical limitations, smaller nip rolls may be employed in advance of the large nip rolls, of a laminating apparatus. In a further embodiment, when the laminating apparatus employs large nip rolls, they may be spaced a substantial distance from the small nip rolls with the result that the same roll arrangement can be used for other purposes, as described hereinafter in greater detail. Where dual functioning rollers are not required, and where large and small pairs of such rollers are employed, the larger pair should preferably be as close as possible to the smaller nip rolls; although for different applications, the distance between the nips may influence bonding strength and accordingly, an optimum distance may be selected for any given application. Applicant has found it desirable, for any given set of conditions established by a particular bonding apparatus, and for production of a wide variety of products, it is desirable that the (1) distance between the large and small nip rolls, (2) the diameter of such rolls, (3) the distance between the small nip rolls (i.e. the gap) and (4) the nip pressure should all be adjustable or variable to permit optimum values for any given product to be selected as desired.

In situations where the accumulation of combustion products from the flame can create difficulties, e.g. when using open nip rolls (prior to the main combining nip rolls) in combination with long bonding widths, part of all of the flame stream may be arranged to flow counter to the direction in which the materials to be bonded are moving. That is, instead of the flame being aimed directly at the center of the nip, it may be set at an agle which will allow the combustion products to escape more easily. In such cases, it may also be desirable to use more than one flame.

Still further, it has been found that in addition to obtaining a high rate of heat transfer ( desirably as high as possible) between the flame and the surface(s) to be heated, by the high flame temperature and flame velocity, a further essential factor has been determined to be the maintenance of a uniform distribution of these parameters to ensure uniform bonding of the materials. Where the width of the flame-surface contact area can be covered by or stretched across the width of one burner, the problem of maintaining uniform distribution of temperature and heat transfer is substantially less than where one or more flame sources or burners are required. Unfortunately, commercially available high velocity burners with wide flame or blast openings are not generally available, so that for many applications more than one burner is required (of course depending on the width of the area of the material to be treated). In this respect, a study of the temperature profile has shown that where more than one burner is used, and such burners were mounted in a side-to-side relationship (as close as possible) it was found that low temperature zones existed in the "in-between" areas of adjacent burners. To overcome this problem, it is within the scope of this invention that one of several alternatives may be employed. Thus, for example, burners having a generally rectangular shaped gaseous discharge opening may be mounted in a staggered relationship so that the high temperature zones of each burner very slightly overlap each other. In such an arrangement, a preferred embodiment includes the staggering of adjacent burners at an angle to each other, to obtain a substantially continuous and uniform temperature line across the width of the material being heated. For flexibility in operating such burners, it is desirable that they be adjustably mounted to permit a variety of applications. In general, staggering adjacent burners at an angle of between about 55° to about 60° was found to give a satisfactory and uniform high temperature line close to the opening of the burners. It will be understood, however, that this angle will vary depending on several factors, including the size of the nip rolls and accordingly, adjustments may be made as desired.

In an alternate embodiment of the above, there may also be used burning means which include a generally circular shaped gaseous discharge opening, capable of creating a generally circular flame. By utilizing such means, there may be produced a round flame which fans out, thereby increasing the effective heating area compared to the actual size of the discharge opening in the burner means. Thus, a plurality of such means could be employed, again in a generally staggered relationship, to provide a heating zone of a desired width.

In a still further alternative for securing a more uniform temperature and heat transfer distribution, there may also be employed a bonding or laminating apparatus which includes an open nip in advance of the laminating or bonding nip rolls per se, to provide an area for the hot gases of the flame to mix, spread out and level out the temperature profile. Studies by the applicant have shown that for greatest bonding strength in certain applications the nip opening or gap should not be greater than approximately one-half the height of the blast opening (i.e. the thickness of the flame). Thus, for example, utilizing a blast opening having a height of approximately 125 mils, a nip opening of approximately 50 mils has been found to provide optimum bond strength for certain applications. While not wishing to be limited to any theory, it appears that when the nip opening is smaller than the flame thickness, it allows a portion of the flame to impinge on the surface of the material being heated at an angle(s) which will break/disturb the travelling boundary layer of gas adjacent the surface of the material being heated, and thereby improve the rate of heat transfer. This embodiment can be used to advantage with the above described burner arrangements and methods, or in the alternative, by utilizing the previously described procedures with the burners located in a side-by-side relationship.

For use in the present invention, any suitable combustible gaseous substance may be employed to provide the heating flame, which gaseous substance is capable of reacting in situ, to produce the requisite high temperatures employed by applicant's process. Preferably, the gaseous substance is a gaseous mixture of a hydrocarbon fuel and a gas containing oxygen, whereupon, on combustion, there may be produced water vapor as one of the by-products. In this respect, it has been found that water and/or water vapor can play a significant role in the bonding of themoplastic surfaces. For example, for certain laminates it has been found that the strength of the bond increases during storage. While this is not fully understood, it is apparent that the role of the water will vary with the application and the nature of the materials involved. In certain instances, to obtain optimum bonding, it may be desirable to add water vapor to the combustible gaseous material or to the combustion products—by, for example, injecting steam into the flame. Specific types of gaseous combustible materials include, e.g., propane and and, hydrogen and oxygen or air, acetylene and oxygen or air, etc. Naturally, as will be evident, the gaseous combustible material should be chosen so as to produce the highest possible temperatures within the most reasonable cost factor, for commercial purposes.

In carrying out the process of this invention, the heated material may be bonded together in a suitable apparatus; the bonding pressure chosen depending on several factors including the different types of material, the width and/or length of the nip roll or like component, etc. In general terms, higher pressures mechanically required generally larger roll diameters and as mentioned above, larger diameters can interfere with optimum location of the flame for heating purposes. Thus, while higher nip pressures might yield slightly higher bonding strength, a compromise normally has to be employed with the other determining factors of the process, including economics. In this respect, it has been found, as evident from the following examples, that increased peel strength can be obtained by utilizing increased nip pressures on small nip rolls, while maintaining a constant pressure on large nip rolls. Thus, for any given type of material, and other factors as will be evident from the teachings of this disclosure, suitable optimum pressures may be chosen for either or both the large and small nip rolls.

As briefly outlined hereinbefore, the apparatus employed to bond or laminate two or more materials together may be any suitable apparatus for this purpose. Such apparatus is well known to those skilled in the art of bonding per se, and to this end, at least one pair of opposed nip rolls are employed; preferably such opposed nip rolls are adjustably mounted to permit varying degrees of pressure to be exerted therebetween. Further any suitable means may be employed for feeding the material into and through the laminating apparatus.

The process of the present invention may be employed to heat one or more layers of flame heatable materials, which on subsequent bonding with one or more additional layers, of the same or different material, is capable of forming a laminate. To this end, suitable materials for use in the present invention includue various types of thermoplastic film materials, typical examples of which include polyethylene, polypropylene (of low, medium or high densities in either case), polyvinylchloride, etc. In general, the type of material utilized in the process of this invention will depend on the desired end use of such material. In heating at least one layer of such materials, the resulting heated material may be bonded to any desired substrate—again, the choice and nature of the substrate will depend on the end use desired. To this end, typically the substrate may be paper, other thermoplastic films of the same or of a different nature, scrim, non-woven and woven materials, etc. Still further, if desired, and inasmuch as the products generally used in the process of the present invention have a pair of opposed major surfaces, both surfaces may be heated and subsequently bonded to the same or different types of substrates on both of said opposed major surfaces. In this respect, the process of this application may be employed as the bonding technique to produce laminates disclosed and claimed in copending applications Ser. No. 93,646 filed Nov. 30, 1970.

The process of the present application lends itself to production of a wide variety and different type of laminates, of varying sizes, shapes and nature. Without being limiting, and by way of example, sheet material may be heated and subsequently bonded to itself to form a tube or flattened lay-flat tubing; heated material may be subsequently laminated to form various types of commercial or consumer products such as bags, etc.

Having thus generally described the invention, reference will now be made to preferred embodiments thereof, taken in conjunction with the accompanying drawings in which.

Figure 1:
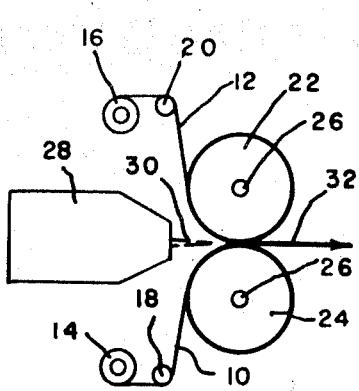
FIG. 1 is a schematic side elevational view showing certain components of the apparatus used to produce the bonded material and carry out the method of the present invention.

Referring initially to FIG. 1, reference numerals 10 and 12, as described hereinafter in greater detail. or the like material, as supplied from sources thereof indicated by reference numerals 14 and 16 respectively. Reference numerals 18 and 20 denote rotatable guide rollers used to convey the film layers 10 and 12 respectively to the site of use.

In general terms, the apparatus of FIG. 1 includes a pair of spaced apart rotatable nip rollers indicated by reference numerals 22 and 24, rotating about central axes 26. Suitable means are provided for rotating rollers 22 and 24 (not shown). The diameters of the respective nip rollers 22 and 24 are relatively small, to permit the highest temperature point, of the hottest commercialy available combustible material forming the flame, to impinge on the surface of the layers of thermoplastic material 10 and 12, as described hereinafter in greated detail.

The apparatus also includes one or more burners indicated by reference numeral 28, mounted by suitable means (not shown) and connected to a source of combustible gaseous material (not shown). As just mentioned, preferably the combustible material is of a type which is of a relatively low cost, commensurate with providing very hot flame, as shown in dotted lines in FIG. 1 and indicated by reference numeral 30.

Following the flame heating operation, as described hereinafter, the layers of thermoplastic material 10 and 12 pass between the rotatable opposed nip rollers 22 and 24, where they are bonded or laminated together to form a laminate 32, which laminate 32 retains substantially all of the strength characteristics of the individual layers 10 and 12 and is substantially free from bulk distortion as compared to conventional prior art products. In this respect, the nip rollers 22 and 24 are mounted on suitable frame means (not shown) and are desirably adjustably spring loaded to exert a varying degree of presure, depending on the type of materials being laminated. Normally, the pressure exerted by the nip rolls on the layers 10 and 12, to form the laminate 32, is adjusted to provide an optimum bond commensurate with obtaining uniform properties in the resulting laminate. In this respect, nip rollers 22 and 24 may be provided with internal cooling means to maintain the temperatures of the respective rollers at a desired degree and avoid heat build-up.

Figure 2:
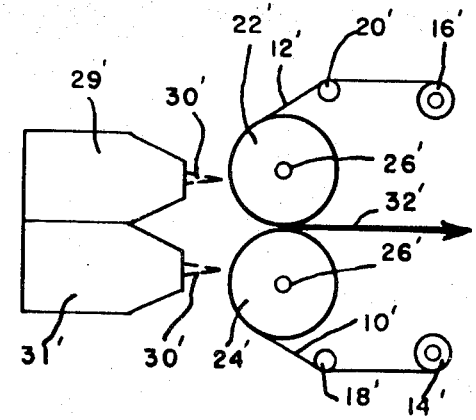
FIG. 2 is a schematic side elevational view of an alternate embodiment to FIG. 1.

Referring now to FIG. 2 illustrating an alternate embodiment to that of FIG. 1, the same components designated by reference numerals in FIG. 1 are designated by the same reference numerals in FIG. 2, except that the components in FIG. 2 include a prime (') designation. Thus, in FIG. 2, the arrangement of burners and flames illustrated may be employed so as to more easily vent the combustion products of the flame (away from the nip). In this case, the burners indicated by reference numerals 29 and 31 are separately directed each to treat one of the webs or layers of materials 14' and 16'. Thus, the flames 30' impinge on separate layers 14' and 16' from the different burners 29 and 31.

Figure 3:
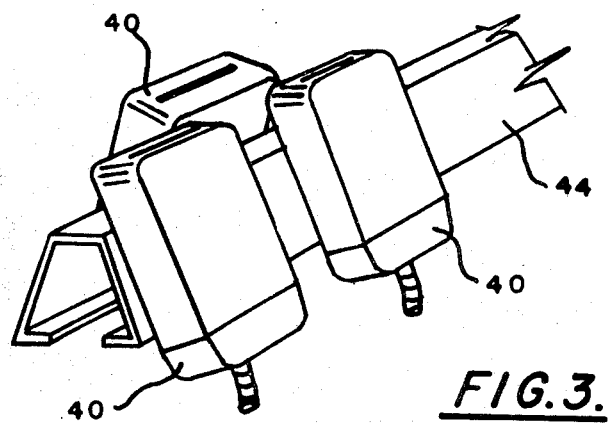
FIG. 3 is a perspective view showing burner components used in the apparatus of the present invention.
Figure 4:
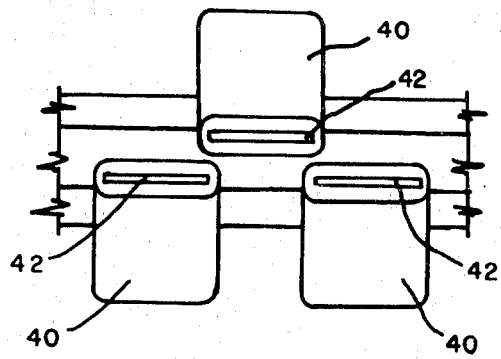
FIG. 4 is a side elevational view of the burner units of FIG. 3.

Referring now to FIGS. 3 and 4, there is illustrated a type of burner arrangement which may be employed with the apparatus described in FIG. 1, to carry out the process of the present invention. More specifically, in FIGS. 3 and 4 there are illustrated three burner units of a generally similar configuration, which are "rectangular-tongue" burners. Thus, each burner indicated generally by reference numeral 40 includes a generally elongated rectangular aperture 42 discharging combustible gaseous material from a supply thereof (not shown). Each burner 40 is mounted to supporting means 44, which may be connected by suitable means to the frame of the apparatus. As illustrated in FIG. 4, the burners 40 are mounted in a generally staggered relationship whereby the apertures 42 just meet or slightly overlap each other. The triangularly shaped configuration of the bunrers, as will be seen from FIG. 3, are generally inclined slightly at an angle to each other—in the order of from 55 to 60°. Thus, opposed staggered rows of such burners may be employed, the width of the total burner openings 42 generally corresponding to the width of the material to be heated, with the burners in each opposed row being angled towards each other as indicated above. Thus, the system of burners 40 illustrated in FIGS. 3 and 4 may be utilized in the apparatus schematically illustrated in FIG. 1, and in effect, replacing the burner 28 of FIG. 1.

Figure 5:
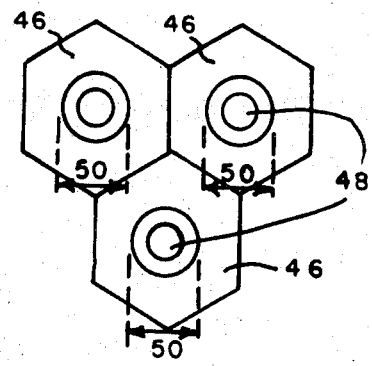
FIG. 5 is a side elevational view of alternate burner units for use with the apparatus of the present invention.
Figure 6:
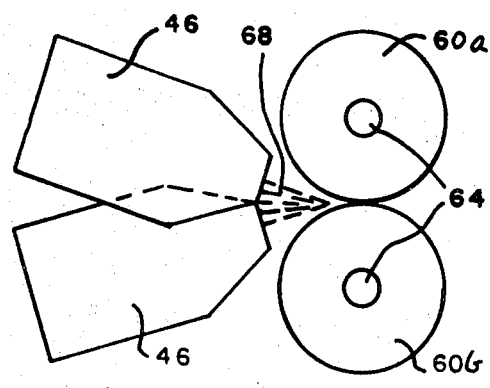
FIG. 6 is a front elevational view of alternate burner units for use with the apparatus of the present invention.

Referring now to FIGS. 5 and 6, there is illustrated an alternate type of burner which may be employed in carrying out the process of this invention. More specifically, the burners illustrated comprise three separate burners indicated by reference numerals 46, each with a generally circularly shaped blast opening indicated by reference numeral 48, through which combustible gaseous material is discharged and ignited. Each burner 46 is mounted in a staggered relationship to an adjacent burner; in effect, the pattern of burners illustrated in FIG. 4 forms a pair of opposed rows of such burners (depending on the number in each row—a factor in turn which will depend on the width of the material to be heated). As with respect to FIGS. 3 and 4, the burners are in a staggered relationship between the opposed rows, and are preferably angled towards each other as will be seen from FIG. 6. To this end, again the angle is preferably between about 55 to 60°.

Depending on the specific mounting arrangement of such burners with respect to the bonding apparatus, and by adjusting the spacing of the burners to the apparatus, the effective bonding area of the flame emanating from each burner may be, as indicated by lines 50, so arranged such that each burner provides a heating zone terminating at the borders of the adjacent heating zone of an adjacent burner. In this manner, a generally uniform temperature profile may be obtained across the complete width of the material being heated by such a burner arrangement. Thus, this burner arrangement (as well as that of FIGS. 3 and 4) are especially well suited for applications involving only one pair of nip rolls as shown in FIG. 6 where the nip rolls etc. correspond to that for FIG. 1.

Figure 7:
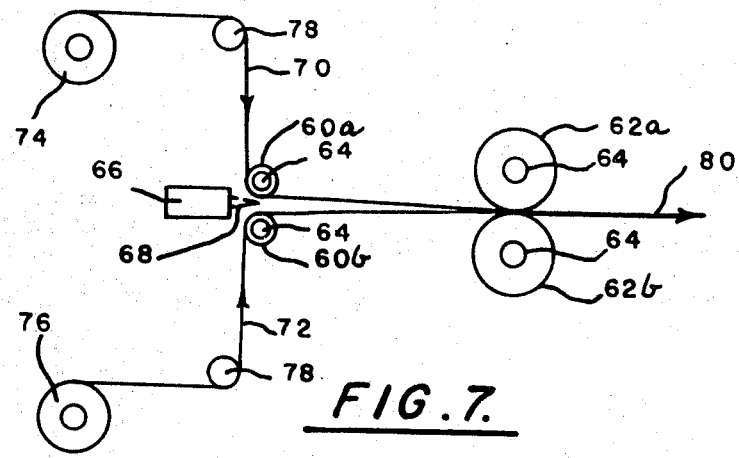
FIG. 7 is a schematic side elevational view of a general apparatus suitable for use in carrying out the present invention.

Referring now to FIG. 7, there is illustrated one embodiment of the process of the present invention, in which the bonding apparatus utilizes two pairs of spaced-apart nip rolls indicated generally by reference numerals 60a and 60b; and 62a and 62b. Each roll rotates about a central shaft 64 which may or may not be driven depending on the type of apparatus employed. Rolls 60a and 60b are of a generally small diameter, which may be in the order of from about 1 inch to about 4 inches, depending on their length. As will be seen from this figure, each of the rolls 60a and 60b is spaced apart from each other to provide a nip gap, which gap is preferably adjustable by adjustably mounting the rolls 60a and 60b by suitable means to the frame of the apparatus (not shown). With respect to rolls 62a and 62b, likewise, suitable mounting means may be employed for mounting such rolls (not shown); preferably the mounting means are such that they permit an adjustable gap to be formed, and permit a varying degree of pressure to be exerted on the heated material.

In the embodiment illustrated in this figure, a burner arrangement, such as that illustrated in FIGS. 3 and 4, or in the alternative FIGS. 5 and 6, may be employed and as generally indicated by reference numeral 66. The burner arrangement produces a flame indicated generally by reference numeral 68, which is directed between the nip gap formed by the opposed rolls 60a and 60b. Between this nip gap there are fed a pair of film webs 70 and 72 taken from supplies 74 and 76; guide rolls 78 serve to guide the film webs 70 and 72 to the nip gap.

In this embodiment, by utilizing the arrangement shown, the spaced-apart nip rolls provide a nip gap, which in turn provides an area for the hot gases to mix and spread out, as well as level out the temperature profile of the flame 68. While in the present illustration, the nip gap is approximately equal to that of the flame thickness, as explained hereinbefore, the nip gap formed between rolls 60a and 60b is preferably of a size less than about half the thickness of the flame. This type of arrangement has been shown to provide the best bonding strength in certain applications.

Following heating of the film materials 70 and 72 they are then brought into juxtaposition by nip rolls 62a and 62b, to form a bonded laminate 80. This bonded laminate may then be wound up.

Figure 8:
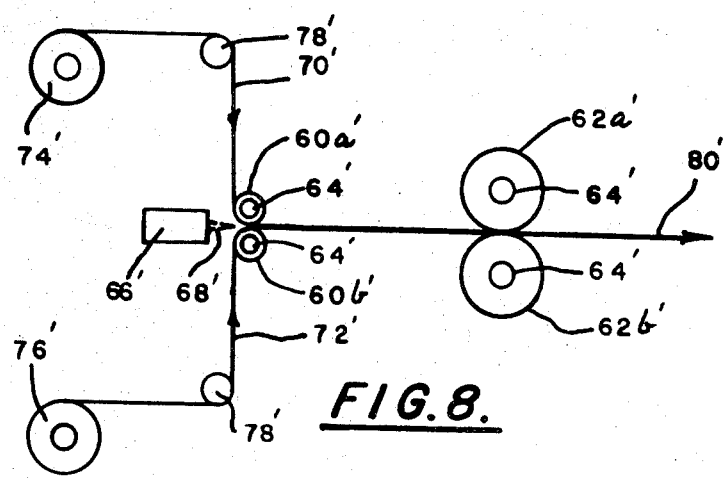
FIG. 8 is a view similar to that of FIG. 7 showing an alternate embodiment.

Referring now to FIG. 8, there is illustrated an alternate embodiment to FIG. 7. In this embodiment similar reference numerals designate similar components to those described with respect to FIG. 7—but in FIG. 8, have been designated with a prime ('). In this alternate embodiment, the nip rolls 60a and 60b are so mounted such that there is no nip gap formed between the spaced-apart rolls, whereby the heated film material may be bonded by passing between rolls 60a and 60b—suitable pressures being applied between the rolls.

The arrangement of FIG. 2 may also be employed in combination with that of FIG. 8 as described above, in which case the flame or flames would impinge on the small nip rolls. A single burner with two flame exits, each at an angle to the other and each directed at its corresponding nip rolls, could be used to good effect in this situation. Thus, with respect to the arrangement of FIG. 2, or the combination of the arrangement of FIGS. 2, and 7 or 8, part of the products will be carried towards the nip along with the material to be bonded, and part will flow counter to the direction of the material. By varying the angle of the burner a greater or less proportion of the combustion products can be directed away from the nip. In certain situations, for example, where only one of the materials to be bonded is thermoplastic, one flame may be sufficient.

Having thus generally described suitable apparatus for carrying out the process of the present invention, reference will now be made to the following examples illustrating preferred embodiments only.

Examples 1-6

In this series of examples, various types of thermoplastic film materials were bonded to various types of substrates (as described hereinafter) using the apparatus illustrated in the drawings. The purpose of these examples was to produce laminates using the process of the present invention and to assess the bond strength and the bulk tensile characteristics, of the resulting laminates produced by the process.

In these examples, the product designated "Sample A" employed high density polyethylene woven tape (15 x 15 tapes per square inch) fabric coated with low density polyethylene and which was bonded to an identical fabric substrate. Sample B was substantially identical to Sample A without the low density polyethylene coating. In Sample C, oriented polypropylene woven tape (15 x 15 tapes per square inch) fabric was bonded to an identical fabric substrate. Sample D utilized the same polypropylene product of Sample C, but in this case, was bonded to 50 pound per ream (basis weight) Kraft paper.

Examples 1 to 5 were carried out utilizing the burner arrangement of FIGS. 5 and 6, in a bonding apparatus similar to that schematically shown in FIG. 1. Example 6 was carried out using the burner arrangement similar to that of FIGS. 3 and 4, again utilizing an arrangement similar to that of FIG. 1. The following Table I indicates the process conditions and the characteristics of the resulting laminates obtained.

TABLE I

| | | Process | | Product | | | |
|---|---|---|---|---|---|---|---|
| | | Bonding velocity, f.p.m. | Pressure nip rolls, p.l.i. | Bond strength, p.l.i. | | Bulk tensile, p.l.i. | |
| Example | Sample | | | Peel | Shear | Before | After |
| 1 | A | 300 | 60 | 3.0 | 55 | 120 | 122 |
| 2 | B | 200 | 60 | 5.0 | | 120 | 82 |
| 3 | B | 150 | 60 | 6.0 | | 120 | 80 |
| 4 | C | 300 | 60 | 2.7 | 55 | 120 | 120 |
| 5 | C | 400 | 60 | 3.1 | 47 | 120 | 119 |
| 6 | D | 225 | | Paper failure | | 120 | 110 |

NOTE.—F.p.m.=feet per minute; p.l.i.=pounds per linear inch.

The peel strength of the resulting laminates was determined by peeling one layer, with respect to the other, at a 90° angle.

Examples 7-34

This series of Examples is similar to preceding Examples 1 to 6, except that in these examples, bonding of plain films was employed in place of utilizing the woven fabric substrates of the above examples. The process conditions, and the product characteristics of these examples, are shown in accompanying Table II.

TABLE II

| Film laminate | | Process¹—Velocities, f.p.m. ×10³ | | Product—Peel strength, p.l.i. (90°) |
|---|---|---|---|---|
| Number | Description | Bonding | Flame | |
| 7 | 6-LDPE/6-LDPE | 0.500 | 33 | Elongation. |
| | | 0.250 | 12 | Do. |
| 8 | 3-LDPE/3-LDPE | 0.500 | 33 | Do. |
| | | 0.300 | 12 | Do. |
| 9 | 6-LDPE/6-LDPE | 0.600 | ²20 | 2.1. |
| | | 1.000 | ²20 | 6.4. |
| 10 | 1-LDPE/1-nylon | 0.500 | 33 | 1.0. |
| | | 0.225 | 12 | 1.0. |
| 11 | 2-LDPE/1-nylon | 0.500 | 33 | 1.5–2.0.⁴ |
| | | 0.225 | 12 | 1.5–2.0.⁴ |
| 12 | 3-LDPE/1-nylon | 0.500 | 33 | 1.5–2.0. |
| | | 0.225 | 12 | 1.5–2.0. |
| 13 | 1-LDPE/0.75-Mylar | 0.400 | 33 | 1.0. |
| | | 0.225 | 12 | 1.0. |
| 14 | 3-LDPE/0.75-Mylar | 0.400 | 33 | 1.0–1.5. |
| | | 0.225 | 12 | 1.0–1.5. |
| 15 | 1-LDPE/0.5-Melinex | 0.400 | 33 | 1.0. |
| | | 0.225 | 12 | 1.0. |
| 16 | 3-LDPE/0.5-Melinex | 0.400 | 33 | 1.0–1.5. |
| | | 0.225 | 12 | 1.0–1.5. |
| 17 | 3-LDPE/2.5-HDPE(V) | 0.400 | 33 | 1.5–2.5. |
| | | 0.225 | 12 | 1.5–2.5. |
| 18 | 2-LDPE/2-Teflon(C) | 0.225 | 20 | 1.3. |
| 19 | 2-LDPE/2-acrylic | 0.400 | 20 | 2.0. |
| 20 | 2-LDPTE/1-polyurethane | 0.400 | 20 | 2.0. |
| 21 | 2-LDPE/4-vinylite | 0.350 | 20 | 0.9. |
| 22 | 2-LDPE/1-polystyrene | 0.400 | 20 | 2.0. |
| 23 | 3-LDPE/0.75-PP | 0.400 | 33 | 1.0–1.5. |
| | | 0.225 | 12 | 1.0–1.5. |
| 24 | 1-LDPE/2-HDPE(K) | 0.250 | 20 | 1.2. |
| 25 | 3-LDPE/0.5-Al. foil | 0.400 | 33 | 1.5. |
| | | 0.225 | 12 | 1.5. |
| 26 | 3-LDPE/1-cellophane | 0.400 | 33 | 1.3–1.5. |
| | | 0.225 | 12 | 1.0–1.5. |
| 27 | 2-HDPE(K)/1-nylon | 0.250 | 20 | 0.3. |
| 28 | 2-HDPE(K)/0.5-Melinex | 0.250 | 20 | 0.5. |
| 29 | 2-HDPE(K)/paper | 0.250 | 20 | 0.3. |
| 30 | 2-HDPE(K)/0.5-Al. foil | 0.250 | 20 | 1.0. |
| 31 | 2.5-HDPE(V)/2.5-HDPE(V) | 0.600 | ²20 | 1.4. |
| | | 1.000 | ²20 | 3.0. |
| 32 | Scrim PP/paper (tissue) | 0.225 | 33 | Paper failure. |
| 33 | 1-nylon/1-nylon | 0.275 | ³20 | 4.2.⁴ |
| 34 | 0.75-PP/1-cellophane | 0.250 | 20 | 0.5. |

¹ Except as indicated in notes 2 and 3 below the roll arrangement was as shown in Fig. 6; small roll diameter was 1.5 inches and large roll diameter was 7.8 inches; pressure on large nip rolls was 126 p.l.i.; distance between large and small nip rolls was 3.875 inches; the gap between small rolls was 46 mil; Selas Corp. SH-2 rectangular burner was used; propane-air flame.

² Pressure on small nip rolls was 60 p.l.i. and round-tongue Selas Corp. burners (SM-610-NA) was used.

³ Same burner as for 2 and small nip roll pressure of 5 p.l.i.

⁴ Indicates film failure at that peel strength.

NOTE.—F.p.m.=feet per minute; p.l.i.=pounds per linear inch; LDPE=low density polyethylene; HDPE=high density polyethylene; (V)=Valeron=laminated oriented film; (K)=Koppers film. The number before the material indicates the thickness in mils of the material—Mylar=polyester film; Melinex=terephthalic acid ester (Ex. 15 and 16); Teflon=polytetrafluoroethylene; Vinylite=vinyl chloride; Al.=aluminum; PP=polypropylene.

Example 35

In this example, a round-tongue burner (SH–610–NA) was used for seaming or forming tubes of various types of film/laminates. The flame velocity employed was approximately 19,000 f.p.m. and the bonding pressures were 60 p.l.i. on the small nip rolls (as shown in the arrangement of FIG. 8) and 126 p.l.i. on the large nip rolls.

When using unoriented film, such as low density polyethylene, under the above conditions, the bond strength (e.g. the peel strength) was at a maximum (i.e. film failure was approximately 7 p.l.i.) at a bonding velocity of approximately 600 f.p.m.; the bonding strength then fell off fairly rapidly with increasing bonding velocity (e.g. at 1,000 f.p.m., the peel strength was approximately 1.5 p.l.i.).

On the other hand, when using oriented film or laminates such as Valeron (the trade mark designating crosslaid, oriented high density polyethylene), the bond strength increased at first with increasing bonding velocity until a maximum was reached, whereafter it then fell off. By way of example, with Valeron, the peel strength was 1.0 p.l.i. at 300 f.p.m. and approxamtely 3 p.l.i. at 800 f.p.m. At the lower velocities the bulk properties (orientation, etc.) were affected and those changes apparently effect the bonding of the material.

In addition to good bond strength, bonding can be effected right to the edge of the film material without thin spots developing, as it often the case with conventional bonding procedures.

Example 36

In addition to the above procedures for making film laminates, tubing, etc. it has been found that the present invention can also be used to advantage, in the manufacture of cap sheet bonding such as is used for block bottom bags.

Accordingly, for this example, bag ends were arranged in the form of a belt so that they came into contact with the cap sheet right at the nip roll, when using an apparatus such as illustrated and described with respect to FIG. 8. In this case, by using soft nip rolls, it was found possible to insure proper bonding of the cap sheet to raised outer portions only, and not any inner portion of the bag. In addition, if desired, to permit bonding in undesired areas, fine sprays or coats of water to the areas in which bonding is not desired can also be used to prevent this undesired bonding.

In one series of examples, using SH–2 burners and the arrangement of FIG. 8, with a flame velocity of approximately 20,000 f.p.m. and a bonding speed of 150 f.p.m., with rubber covered nip rolls which had a durometer hardness of from 60–65, with nip pressures of 126 p.l.i. on the large nip rolls, a polyethylene peel strength of approximately 3 p.l.i. was obtained for a nip pressure of 10 p.l.i. on the small nip rolls, and approximately 9 p.l.i. (including film failure) when the nip pressure was increased to 30 p.l.i.

The above examples have been used to illustrate preferred embodiments of the invention; it will be obvious to those skilled in this art upon reading the teachings of this disclosure that there are many other applications involving the bonding of thermoplastic surfaces to a further substrate, even though the overall operation may involve additional steps. Thus, for example, the manufacture of certain types of cylindrical containers (e.g. in which strips of materials are wound in an overlapping fashion around a mandrel), in such procedures where the materials are thermoplastic, the high velocity flame teachings of this invention may be used to advantage to bond the strips together. Still further applications of the present invention involve the use of two or more layers of materials to be bonded or laminated together, in which case, the present invention may be utilized for each pair of mating surfaces. Where the inner layers are of an open network type, such as scrim, etc., the flame or heat from the flame may readily pass through the network and in which case, one flame may be used to bond more than one pair of mating surfaces. Advantageously, this may be employed in the case where open networks (such as fibrillated film, and other scrim like materials, or oriented high density polyethylene or polypropylene, are used to reinforce weak non-woven materials such as paper, to form a disposable reinforced fabric or laminate. In this respect, reference is made to the teachings of copending application Ser. No. 93,646, filed Nov. 30, 1970.

I claim:

1. In a method of bonding materials together wherein there is provided a supply of bondable thermoplastic material and wherein said material is heated to render the same bondable, the improvement comprising heating the surface of said material by applying, in direct contact therewith, a high velocity gaseous flame, said heating being applied to said surface to render said surface substantially uniformly heated in a substantially continuous path thereon, said flame having a flame velocity of above 10,000 feet per minute and a temperature of above 1,000° F., subsequently causing the heated surface to be brought into juxtaposition with a further surface, and pressing said treated surface and said further surface to form a substantially uniformly bonded laminate.

2. A method, as defined in claim 1, wherein the flame velocity is within the range of from 12,000 to 40,000 feet per minute.

3. A method, as defined in claim 1, wherein the temperature is within the range of from about 2,000 to about 2,800° F.

4. A method, as defined in claim 1, wherein said flame is produced and includes water vapor.

5. A method, as defined in claim 1, wherein said bonding is carried out by feeding the heated material and an additional layer of material, between a pair of opposed bonding rollers.

6. A method, as defined in claim 1, wherein there is provided at least two supplies of bondable material, one of said supplies being a web of bondable thermoplastic material, and wherein both of said materials are heated, said method including bringing the heated materials into at least partial juxtaposition with each other, and pressing the juxtaposed materials to form a bonded laminate.

7. The product of claim 9, wherein said material is bonded to itself.

8. The product of claim 9, wherein said material is bonded to at least one further layer.

9. A bonded product, produced by the method of claim 1, and comprising at least one layer of a thermoplastic material substantially uniformly bonded to a further layer without the use of adhesives, the thermoplastic layer having been heated with a gaseous high velocity flame having a velocity greater than 10,000 feet per minute and a temperature of higher than 1,000° F., the bonded material having the property of substantially no reduction in bulk characteristics compared to the material individually forming the bonded material.

References Cited
UNITED STATES PATENTS

| | | | |
|---|---|---|---|
| 3,210,227 | 10/1965 | Shichman | 156—82 |
| 3,153,683 | 10/1964 | Bryan et al. | 156—82 |
| 3,481,804 | 12/1969 | Snyder | 156—82 |

ALFRED L. LEAVITT, Primary Examiner

F. FRISENDA, Assistant Examiner

U.S. Cl. X.R.

156—299, 301; 161—182; 264—80